United States Patent [19]

Ross

[11] 4,125,757
[45] Nov. 14, 1978

[54] APPARATUS AND METHOD FOR LASER CUTTING

[75] Inventor: William A. Ross, New Hartford, Conn.

[73] Assignee: The Torrington Company, Torrington, Conn.

[21] Appl. No.: 848,457

[22] Filed: Nov. 4, 1977

[51] Int. Cl.$^2$ .............................. B23K 9/00
[52] U.S. Cl. .................. 219/121 L; 219/72; 219/121 LM
[58] Field of Search ..... 219/121 L, 121 LM, 121 EB, 219/121 UW, 121 P, 72, DIG. UW

[56] References Cited

U.S. PATENT DOCUMENTS

| | | | |
|---|---|---|---|
| 2,572,796 | 10/1951 | Woodard | 219/DIG. UW |
| 3,851,864 | 12/1974 | Miller | 219/121 P |
| 4,002,877 | 1/1977 | Banas | 219/121 LM |

Primary Examiner—J. V. Truhe
Assistant Examiner—Fred E. Bell
Attorney, Agent, or Firm—Frank S. Troidl

[57] ABSTRACT

A laser beam is directed towards a workpiece immersed beneath the surface of a liquid coolant. An exothermically reactive gas is directed through the liquid coolant to the workpiece under sufficient pressure and velocity to sweep away a sufficient amount of the liquid coolant to expose part of the workpiece to the laser beam for cutting.

5 Claims, 3 Drawing Figures

APPARATUS AND METHOD FOR LASER CUTTING

This invention is a method and apparatus for cutting thin thermally conductive materials to very close tolerances using a laser beam as the cutting tool.

Lasers have been in use for some time and are becoming more useful as a metal working tool. Depending upon the size and the type of laser being used, they are capable of drilling holes, welding, and/or cutting a large variety of materials.

Of particular interest is the Carbon Dioxide laser $CO_2$ which is capable of producing a laser beam powerful and controllable enough to vaporize and cut into or cut away a variety of materials in various thicknesses in literally milli-seconds of time. A $CO_2$ laser beam is a continuous beam of optical energy. It is capable of producing a beam with many thousands of watts of output energy, however, the most common and most sought after are those which have output power in the 250 to 1000 watt range. By employing the proper optical devices and techniques the beam, which may, for example, be 6MM in diameter, can be focused down to give a final focused spot size of 0.001 inch to 0.005 inch diameter and it can be reduced further yet with more complex optical devices. It can be readily appreciated that when the energy in a 6MM beam diameter is concentrated on a spot of approximately 0.005 inch diameter, there is a tremendous amount of heat generated at that spot, enough so that it can vaporize almost any substance known.

If a laser beam is allowed to impinge on a material while the material and/or laser beam are in lateral motion with respect to each other, the beam will either "cut" a groove, or slit the material clean through depending on the material thickness and the speed of relative motion.

If, as previously mentioned, the material and/or the laser beam are moved laterally to each other but maintaining beam focus on the material, it is possible to cut a straight line slot and/or pattern of almost any conceivable shape. By first determining exactly what shape is desired and then holding the workpiece in a simple but suitable fixture, one may cut out everything from paper dolls to refrigerator door panels by manipulating the laser beam and/or the workpiece. There are optical devices available for manipulating the beam, and there are programmable two-axis motion systems available for moving the workpiece and its associated fixturing. Usually these systems operate from a prepunched tape or a small computer and are capable of following a programmed path and repeating themselves over and over again with exacting repeatability and accuracy.

When a laser beam strikes a workpiece, the workpiece must be capable of absorbing the laser beam so that the optical energy of the beam can be converted to heat energy, thereby boiling away or gasing away that portion the beam is striking. Every material is different in the amount of the beam energy it will accept and absorb, the remainder being reflected away. The amount or percentage of beam absorbed vs. the amount of beam reflected is dependent on several things. The workpiece material itself, the surface finish, the surface color, and very important, the temperature of the workpiece. Each given workpiece will absorb more of the beam as its temperature increases, and more material is removed as the temperature increases.

However, a very serious problem develops when one tries to "profile" cut out small parts with high accuracy and good dimensional control from thin materials which have a high rate of thermal conductivity. Thin parts in this case refers to materials having thickness ranges from "foil thick" up to ¼ inch. Materials of high thermal conductivity include carbon steel or tool steels, as opposed to, say, ⅛ inch thick cardboard.

Briefly described, this invention is a method and apparatus for cutting a workpiece with a laser beam. A laser beam is directed towards and concentrated on a workpiece immersed in a liquid coolant anywhere from just beneath the surface to possibly one inch beneath the surface. An exothermically reactive gas is directed through the liquid coolant under sufficient pressure and velocity to sweep away a sufficient amount of the liquid coolant to expose part of the workpiece to the laser beam which thereupon "cuts" the workpiece. The liquid keeps the rest of the workpiece relatively cool.

The invention as well as its many advantages may be further understood by reference to the following detailed description and drawings in which.

In the various Figures, like parts are referred to by like numbers.

Figure 1:
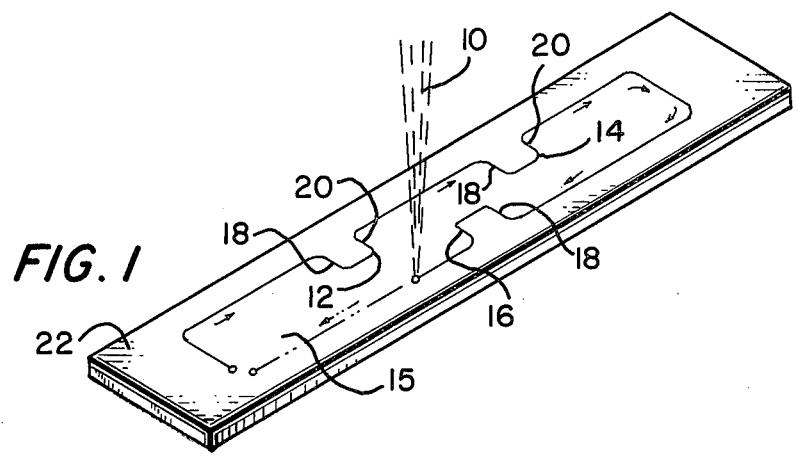
FIG. 1 is a perspective view, partly schematic, useful in explaining the advantages of the invention.

FIG. 1 schematically illustrates a shape in outline which is desired to be precisely cut from a thermally conductive workpiece 22 by a focused laser beam 10 which traverses the path shown. For example, if one is attempting to accurately profile cut the shape 15 as shown in FIG. 1 from 0.015 inch to 0.050 inch thick carbon steel, the problem manifests itself.

If we have a beam 10 with a focused spot diameter of 0.005 inch at the start point, and by manipulating the beam and/or the workpiece we cut clockwise (in the direction of the arrows) around the prescribed path, intense heat is generated on the path and a percentage of this heat is conducted into the surrounding material. Because the material has a very high rate of thermal conductivity, large amounts of heat are transferred very rapidly throughout the part. As the beam 10 progresses along and reaches points that are of higher temperature, more of the beam is absorbed thereby removing more material on each side of the beam path than was removed when the workpiece temperature at the point of cutting was lower. In addition, the workpiece is continually expanding in size as it heats up. In straight line cutting the problem is not so severe. The problem is severe where the beam "passes" itself, as at reversal points 12, 14, and 16. As the beam progresses up side 18, the part is, of course, heating up, the beam then turns around at point 12 and progresses down side 20. Side 20 having received conducted heat from the previous cutting is now much hotter than side 18 was, more beam is absorbed, and more material is removed, and the cut line location itself is not under good control because the workpiece in expanding at a non-uniform rate which cannot be compensated for. To aggravate the problem, it is common practice to have a jet of oxygen gas spraying on the workpiece 22 right at the point the laser strikes the workpiece. The addition of oxygen greatly adds to the cutting efficiency of the laser beam because when oxygen is mixed with a super-hot material, the material not only melts or vaporizes, but also oxidizes or "self-burns" on its own. This is an exothermic reaction. Again, the hotter the workpiece, the more "self-burning" will occur with even greater loss of dimensional control. Sometimes compressed air is used instead of pure oxygen, but with a loss of cutting effectiveness.

It is now easy to see that with this increasing heat and temperature change in the workpiece, the reaction of the beam and its oxygen jet on the material is rapidly changing and it becomes impossible to control the cut width or location of the beam path to any high degree of accuracy. Where we may be able to dependably hold dimensional tolerances no better than ±0.010 inch on flat machine parts by using conventional laser cutting, using my system we in many cases hold tolerances of ±0.001 inch on those same parts.

What is required, of course, is a method and apparatus to remove this heat buildup. To spray a liquid coolant as is done by the method of U.S. Pat. No. 4,002,877 or to spray a gas coolant on the workpiece as cutting occurs is not good because it interferes with and disrupts the action on the workpiece of the laser beam and/or the jet of oxygen, both of which must be carefully controlled. To supercool the workpiece and then cut is not a solution because the workpiece is again heating as it is being cut, the only difference is it is heating up from a lower temperature to start with, but the same reaction will occur, in fact will be worse, because the workpiece is so low in temperature it will absorb heat at a faster rate.

Figure 2:
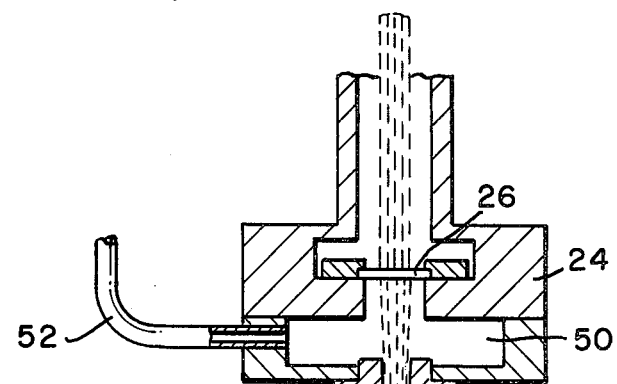
FIG. 2 is a sectional, elevational view illustrating the invention.

I immerse the workpiece in a liquid, generally water, to dissipate the heat which has been conducted away from the cutting point, so that the general temperature and dimensions of the workpiece will remain relatively constant throughout the laser cutting operation. I employ a column of exothermically reactive gas coaxial with and around the laser beam to sweep away the liquid over the cutting area so the liquid will not interfere with the laser beam. The beam melts or vaporizes the material while the oxygen, in addition to blowing away the coolant, oxidizes or burns the workpiece material in the desired profile lines. As shown in FIG. 2, a housing 24 which holds the laser beam focusing lens 26 is constructed with a gas chamber 50 which receives oxygen through a supply conduit 52, and the gas exits chamber 50 through a small orificed nozzle 28 so attached that the laser beam passes along its axis. The nozzle tip is calculated to be close to the laser beam's focal point. With this construction the laser beam 10 and the oxygen jet 30 will strike the workpiece 22 coaxially with each other and substantially perpendicular to the workpiece, with the gas in a cylindrical column 30 about the laser beam 10.

The optical lens 26 directs the laser beam 10 toward and focuses it on the workpiece 22 mounted in the container 38. The workpiece placed in its suitable holding fixture of supports 32 and 34 is submerged in a liquid coolant 36 in container 38, in this case water, however, other coolants may be used. The depth of the coolant over the workpiece is variable but generally ¼ inch seems sufficient. Lesser and greater depths are practical for specific workpieces, from a depth of only several thousandths of an inch up to ½ inch, and more.

The laser beam is now focused on the workpiece 22. The tip of the nozzle 28 is located close to the workpiece, say, 0.010 inch to 0.200 inch away.

To start the operation, the oxygen is turned on first and must exit the small orificed nozzle 28 at high enough velocity to displace the water covering the workpiece right under the nozzle and 360° radially around the laser beam. The area and volume of water displaced, or area of "bare" spot 40 showing, is dependent on depth of coolant liquid over the part, pressure of the oxygen, diameter of the orifice, and velocity of the oxygen stream. When all these parameters are properly established, it is possible to expose only a very small area of the workpiece for laser cutting; the remainder remains covered with coolant.

Figure 3:
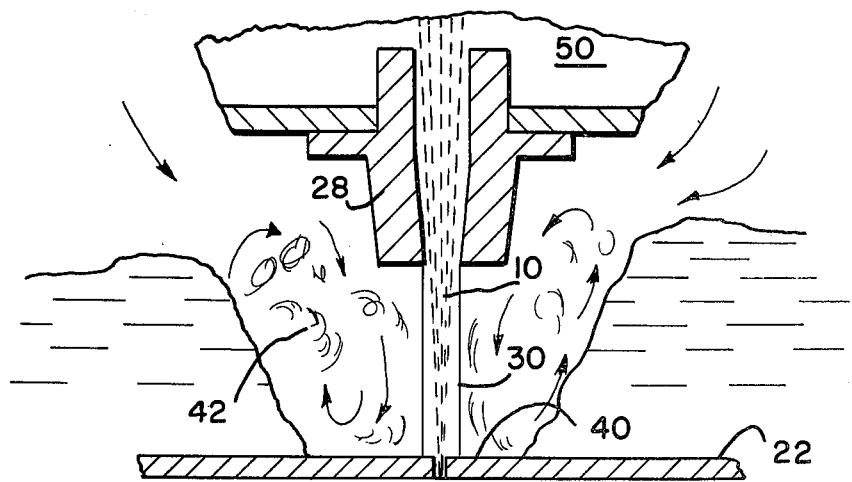
FIG. 3 is a fragmentary, sectional view illustrating the exposure of a part of the workpiece by the exothermically reactive gas and the impingement of the laser beam on the workpiece to form the cut.

A second action is caused by a drop in atmospheric pressure immediately adjacent to the high velocity stream 30 of oxygen as it exits the nozzle 28. This drop in pressure is common whenever a high velocity stream of gas exits from a nozzle into atmosphere (see FIG. 3). Because the atmosphere wants to remain in equilibrium, surrounding air rushes in in an attempt to reestablish a constant pressure. As the surrounding air is rushing in, it also is capturing and bringing with it large volumes of the coolant which is being turbulently blown into the atmosphere surrounding the jet of oxygen by the jet itself. This now results in a columnar vortex 42 of continuously circulating coolant being formed 360° radially around the jet of oxygen and in very close proximity to the jet.

As soon as the vortex is established, the laser beam is now allowed to come on focused on the workpiece. It is coaxial with the oxygen jet and smaller than the oxygen jet in diameter, and so is protected from the coolant vortex by the surrounding oxygen jet. It "sees" the workpiece because the jet has cleared the coolant from the surface. The burning action begins, and the patterning of the part also is begun by causing relative lateral motion between the workpiece and the laser beam.

As the part is cut, the vortex of coolant is striking the areas adjacent to the cut line and is removing the heat conducted to the surrounding area. As the cut progresses, the cutting action, of course, is occurring under the nozzle and as soon as any given spot on the part has been cut and that spot moves out from under the nozzle, the coolant flows back in and covers the workpiece to its original depth which rapidly removes any last traces of heat buildup remaining in the workpiece.

The vortex is responsible for a large percentage of heat removal. It is impossible to tell exact percentages, but what is important is that this method works and it now becomes possible to accurately laser cut small thin parts out of materials that have a high thermal conductivity, and hold dimensional tolerances on parts in the ±0.001 inch range, and in some cases down to ±0.0005 inch on a dimension.

The lens, of course, should operate at a constant distance from the workpiece to be focused on the workpiece. The nozzle may be made adjustable up and down relative to the focusing lens. It is also desirable at times to change the nozzle tip distance from the workpiece in order to change the vortex and amount of vortex being generated, and to change the area on the workpiece being exposed by the gas jet.

I claim:

1. Apparatus for cutting a workpiece with a laser beam comprising: means for generating a laser beam; optical means for directing the laser beam towards a workpiece; a workpiece holder containing a liquid coolant in which the workpiece is immersed; and means for directing an exothermically reactive gas through the liquid coolant covering the workpiece under sufficient pressure and velocity to sweep away a sufficient amount of the liquid coolant from the workpiece to expose part of the workpiece to the laser beam.

2. An apparatus in accordance with claim 1 wherein: the optical means for directing the laser beam towards the workpiece is an optical lens mounted in a housing; a nozzle is connected at the exit end of the housing for directing the laser beam in a small diameter beam toward the workpiece; and the means for directing the Exothermically reactive gas at the liquid coolant is a gas supply conduit connected to the housing, and a gas chamber in the housing, interconnecting the gas supply conduit and said nozzle whereby the gas exits from the nozzle in a cylindrical wall around the laser beam.

3. An apparatus in accordance with claim 2, wherein: the housing and the workpiece are movable relative to one another.

4. A method of cutting a workpiece comprising: submerging said workpiece in a liquid coolant; applying an exothermically reactive gas against the liquid coolant under sufficient pressure and velocity to displace liquid coolant covering the workpiece and expose a section of the workpiece; and applying a laser beam against the exposed part of the workpiece.

5. A method of cutting a workpiece in accordance with claim 4 wherein: the exothermically reactive gas is applied in a manner to create a substantially cylindrical separating wall between the laser beam and a liquid coolant vortex created by the action of the exothermically reactive gas.

* * * * *